US009230498B2

(12) United States Patent
Xu

(10) Patent No.: US 9,230,498 B2
(45) Date of Patent: Jan. 5, 2016

(54) DRIVING CIRCUIT AND METHOD OF DRIVING LIQUID CRYSTAL PANEL AND LIQUID CRYSTAL DISPLAY

(71) Applicant: Shenzhen China Star Optoelectronics Technology Co., Ltd., Shenzhen, Guangdong (CN)

(72) Inventor: Xiangyang Xu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 88 days.

(21) Appl. No.: 14/232,898

(22) PCT Filed: Nov. 29, 2013

(86) PCT No.: PCT/CN2013/088189
§ 371 (c)(1),
(2) Date: Jan. 14, 2014

(87) PCT Pub. No.: WO2015/074289
PCT Pub. Date: May 28, 2015

(65) Prior Publication Data

US 2015/0145838 A1 May 28, 2015

(30) Foreign Application Priority Data

Nov. 25, 2013 (CN) .......................... 2013 1 0606936

(51) Int. Cl.
*G09G 3/36* (2006.01)
*G06F 3/038* (2013.01)
*G09G 3/14* (2006.01)

(52) U.S. Cl.
CPC ............ *G09G 3/3688* (2013.01); *G09G 3/3648* (2013.01); *G09G 2310/0297* (2013.01)

(58) Field of Classification Search
CPC ........................... G09G 3/3685; G09G 3/3674
USPC .......................................................... 345/205
See application file for complete search history.

(56) References Cited

U.S. PATENT DOCUMENTS 8,830,145 B2 * 9/2014 Okuno et al. ................... 345/76

FOREIGN PATENT DOCUMENTS

CN 1928979 A 3/2007
CN 103065556 A 4/2013

* cited by examiner

*Primary Examiner* — Charles V Hicks
(74) *Attorney, Agent, or Firm* — Andrew C. Cheng

(57) ABSTRACT

A driving circuit includes m×n TFT pixel units, a gate driver, a source driver, m scan lines and 2n data lines. Every row of TFT pixel units is connected to a scan line, and the m scan lines are connected to the gate driver which provides m rows of the TFT pixel units with scan signals through the m scan lines. A first data line and a second data line are set up to every column of the TFT pixel units. Odd-numbered rows of the TFT pixel units are connected to the first data line, and even-numbered rows of the TFT pixel units are connected to the second data line. The first and the second data lines are connected to one source driving chip set up in the source driver through a first switch unit and a second switch unit respectively. The driving circuit can reduce power consumption of the LCD panel, decline of number of source driving chips applied, and reduce production cost.

15 Claims, 4 Drawing Sheets

DRIVING CIRCUIT AND METHOD OF DRIVING LIQUID CRYSTAL PANEL AND LIQUID CRYSTAL DISPLAY

FIELD OF THE INVENTION

The present invention relates to a liquid crystal display (LCD) technology field, more particularly, to a driving circuit, a method of driving a liquid crystal panel and an LCD comprising the driving circuit.

DESCRIPTION OF THE PRIOR ART

Liquid Crystal Display (LCD) is an ultra-thin flat display device formed by a certain quantity of colorful or monochrome pixel positioned in front of light source or reflective planes. LCD is very popular because of low power consumption, high image quality, small volume and light weight, and is mainstream of display devices. A conventional LCD is mostly a Thin Film Transistor (TFT) LCD, and liquid crystal panel is a key component of LCD. Generally LCD comprises a color film substrate, a TFT array substrate set up in opposite to the color film substrate and a liquid crystal layer therebetween. As panel display technology develops, demands for image quality (such as luminance, chromaticity, resolution, visual angle and frame rate) are increasing. In order to reduce power consumption and production cost of panels, panel manufactures are constantly seeking for new technology and new material. Power consumption of a liquid crystal panel depends on driving voltage of liquid crystal and signal frequency. The higher driving voltage and the higher signal frequency are, the greater power consumption of the panel is. Thus to reduce power consumption of a panel, manufactures are constantly develops a low voltage driven liquid crystal, while signal frequency is mainly decided by panel resolution and image frame rate.

FIG. 1 indicates a structural diagram of a conventional liquid crystal panel driving circuit. M rows×n columns of TFT pixel units 2 of m rows×n columns dispersed on a glass substrate 1, and m scan lines Gi and n data lines Dj are set up between rows and columns of the TFT pixel units 2. The $i^{th}$ scan line is correspondingly connected to and controls the $i^{th}$ TFT pixel unit 2, the $j^{th}$ data line is correspondingly connected to and controls the $j^{th}$ TFT pixel unit 2. M scan lines Gi are connected to a gate driver 3, and are controlled by a timing controller 5 to provide arrays of the TFT pixel units 2 with scan signal. N data lines Dj are correspondingly connected to n source driving chips Sj in a source driver 4 respectively, and are controlled by a timing controller 5 to provide arrays of the TFT pixel unit 2 with data signal. When the driving circuit of TFT array substrates of such structure is operating, m scan lines Gi turn on every line of the TFT pixel units 2 in sequence, at the same time n data lines Dj provide every whole column of the TFT pixel units 2 with data signal in sequence, hence signal charging frequency roars, and power consumption of the liquid crystal panel jumps, wherein i=1, 2, 3, . . . , m,j=1, 2, 3, . . . , n.

To reduce signal charging frequency and reduce liquid crystal panel's power consumption, a conventional method applies a driving circuit of double data lines, as FIG. 2 indicates. Different with the driving circuit in FIG. 1, in the driving circuit of double data lines, two data lines Dj1 and Dj2 are set up corresponding to every column of the TFT pixel units 2. The data line Dj1 is connected to all odd-numbered rows of the column concerned of the pixel units 2 and to the source driver 4 through a source driving chip Sj1; the other data line Dj2 is connected to all even-numbered rows of the column concerned of the pixel unit 2 and to the source driver 4 through a source driving chip Sj2. When the driving circuit is operating, two data lines alternatively provide odd-numbered and even-numbered rows of every column of the TFT pixel units 2 with data signal, so that signal charging frequency is reduced, power consumption of the liquid crystal panel is cut down. However, in such driving circuits the number of source driving chips Dj1 and Dj2 in the source driver 4 doubles, which raises difficulty for manufacture and design of the source driver 4, and increases production cost of liquid crystal panels.

SUMMARY OF THE INVENTION

Owing to deficiencies of prior art, one object of the present invention is to provide a driving circuit of liquid crystal panels, which not only reduces signal charging frequency of data lines and cuts down power consumption of the liquid crystal panel, but also reduces number of driving chips applied and difficulty for designing and manufacturing driving circuits, hence to reduce production cost.

According to the present invention, a driving circuit of a liquid crystal panel comprises: a glass substrate with m rows×n columns of TFT pixel units, a gate driver, a source driver, a timing controller, m scan lines and 2n data lines dispersed between arrays of the TFT pixel units; wherein the timing controller provides the gate driver and the source driver with timing signals;

every row of TFT pixel units is connected to a scan line, and the m scan lines are connected to the gate driver which provides m rows of the TFT pixel units with scan signals through the m scan lines;

a first data line and a second data line are set up correspondingly to every column of the TFT pixel units; odd-numbered rows in every column of the TFT pixel units are connected to the first data line, and even-numbered rows in every column of the TFT pixel units are connected to the second data line; the first data line and the second data line are connected to one source driving chip set up in the source driver through a first switch unit and a second switch unit respectively; the source driver provides n columns of the TFT pixel units with data signals through n source driving chip and 2n data lines; m and n are both integers greater than zero.

In one aspect of the present invention, when the gate driver provides odd-numbered rows of the TFT pixel units with scan signals, the first switch unit turns on and the second switch unit turns off, and the source driver provides odd-numbered rows of the TFT pixel units with data signals through n source driving chips and first data lines in every column; when the gate driver provides even-numbered rows of the TFT pixel units with scan signals, the first switch unit turns off and the second switch unit turns on, and the source driver provides even-numbered rows of the TFT pixel units with data signals through n source driving chips and second data lines in every column.

In another aspect of the present invention, the first switch unit and the second switch unit are connected to the timing controller respectively, and the timing controller controls turning on or off the first switch unit and the second switch unit.

In still another aspect of the present invention, the first switch unit is a first MOS transistor, the second switch unit is a second MOS transistor; a gate of the first MOS transistor is connected to the timing controller through a first clock line, a source of the first MOS transistor is connected to the source driving chip, a drain of the first MOS transistor is connected to the first data line; a gate of the second MOS transistor is connected to the timing controller through a second clock line, a source of the second MOS transistor is connected to the source driving chip, a drain of the second MOS transistor is connected to the second data line.

According to the present invention, a method of driving a liquid crystal panel comprises:

providing a gate driver and a source driver with timing signals through a timing controller;

successively providing m rows of TFT pixel units with scan signals through the gate driver;

providing data signals to n columns of the TFT pixel units through the source driver; wherein a first data line and a second data line are set up correspondingly to every column of the TFT pixel units, odd-numbered rows of every column of the TFT pixel units are connected to the first data line, even-numbered rows of every column of the TFT pixel units are connected to the second data line, and the first data line and the second data line are connected to one source driving chip set up in the source driver through a first switch unit and a second switch unit respectively; the source driver provides n columns of the TFT pixel units with data signals through n source driving chips and 2n data lines; m and n are both integers greater than zero.

In one aspect of the present invention, when the gate driver provides odd-numbered rows of the TFT pixel units with scan signals, the first switch unit turns on and the second switch unit turns off, and the source driver provides odd-numbered rows of the TFT pixel units with data signals through n source driving chips and first data lines in every column; when the gate driver provides even-numbered rows of the TFT pixel units with scan signals, the first switch unit turns off and the second switch unit turns on, and the source driver provides even-numbered rows of the TFT pixel units with data signals through n source driving chips and second data lines in every column.

In another aspect of the present invention, the first switch unit and the second switch unit are connected to the timing controller respectively, and the timing controller controls turning on or off the first switch unit and the second switch unit.

In still another aspect of the present invention, the first switch unit is a first MOS transistor, the second switch unit is a second MOS transistor; a gate of the first MOS transistor is connected to the timing controller through a first clock line, a source of the first MOS transistor is connected to the source driving chip, a drain of the first MOS transistor is connected to the first data line; a gate of the second MOS transistor is connected to the timing controller through a second clock line, a source of the second MOS transistor is connected to the source driving chip, a drain of the second MOS transistor is connected to the second data line.

According to the present invention, a liquid crystal display comprises a liquid crystal panel and a driving circuit for driving the liquid crystal panel. The liquid crystal panel comprises a color filter substrate, a TFT array substrate set up in opposite to the color film substrate and a liquid crystal layer therebetween. The driving circuit comprises a glass substrate with m rows×n columns of TFT pixel units, a gate driver, a source driver, a timing controller, m scan lines and 2n data lines dispersed between arrays of the TFT pixel units; wherein the timing controller provides the gate driver and the source driver with timing signals;

every row of TFT pixel units is connected to a scan line, and the m scan lines are connected to the gate driver which provides m rows of the TFT pixel units with scan signals through the m scan lines;

a first data line and a second data line are set up correspondingly to every column of the TFT pixel units; odd-numbered rows in every column of the TFT pixel units are connected to the first data line, and even-numbered rows in every column of the TFT pixel units are connected to the second data line; the first data line and the second data line are connected to one source driving chip set up in the source driver through a first switch unit and a second switch unit respectively; the source driver provides n columns of the TFT pixel units with data signals through n source driving chip and 2n data lines; m and n are both integers greater than zero.

In one aspect of the present invention, when the gate driver provides odd-numbered rows of the TFT pixel units with scan signals, the first switch unit turns on and the second switch unit turns off, and the source driver provides odd-numbered rows of the TFT pixel units with data signals through n source driving chips and first data lines in every column; when the gate driver provides even-numbered rows of the TFT pixel units with scan signals, the first switch unit turns off and the second switch unit turns on, and the source driver provides even-numbered rows of the TFT pixel units with data signals through n source driving chips and second data lines in every column.

In another aspect of the present invention, the first switch unit and the second switch unit are connected to the timing controller respectively, and the timing controller controls turning on or off the first switch unit and the second switch unit.

In still another aspect of the present invention, the first switch unit is a first MOS transistor, the second switch unit is a second MOS transistor; a gate of the first MOS transistor is connected to the timing controller through a first clock line, a source of the first MOS transistor is connected to the source driving chip, a drain of the first MOS transistor is connected to the first data line; a gate of the second MOS transistor is connected to the timing controller through a second clock line, a source of the second MOS transistor is connected to the source driving chip, a drain of the second MOS transistor is connected to the second data line.

Compared with prior art, the driving circuit of liquid crystal panels provided in the present invention connects two data lines in one row of the TFT pixel units to one source driving chip through two switch units, and switch units decide whether to provide odd-numbered rows of the TFT pixel units with data signal of the source driving chip through a first data line, or to provide even-numbered rows of the TFT pixel units with data signal of the source driving chip through a second data line, resulting in decrease of signal charging frequency of data lines, reduction of power consumption of the liquid crystal panel, decline of number of source driving chips applied, less difficulty for designing and manufacturing driving circuits, and finally, drop of production cost.

DETAILED DESCRIPTION OF THE PREFERRED EMBODIMENT

As mentioned above, to solve problems of conventional art, the present invention provides a driving circuit of liquid crystal panels, comprising: m rows×n columns of TFT pixel units dispersed on a glass substrate, a gate driver, a source driver, a timing controller, m scan lines and 2n data lines dispersed between arrays of the TFT pixel units. The timing controller provides the gate driver and the source driver with timing signal. Every row of TFT pixel units is connected to a scan line. M scan lines are connected to the gate driver which provide m rows of TFT pixel units with scan signal through m scan lines. A first data line and a second data line are set up correspondingly to every column of TFT pixel units. Odd-numbered rows of TFT pixel units of every column are connected to the first data line, and even-numbered rows of TFT pixel units of every column are connected to the second data line. The first data line and the second data line are connected to one source driving chip set up in the source driver through a first switch unit and a second switch unit respectively. The source driver provides n rows of TFT pixel units with data signal through n source driving chip and 2n data lines. M and n are both integer above zero.

When the gate driver provides odd-numbered rows of TFT pixel units with scan signals, the first switch unit turns on and the second switch unit turns off, and the source driver provides odd-numbered rows of TFT pixel units with data signal through n source driving chips and first data lines of every column. When the gate driver provides even-numbered rows of TFT pixel units with scan signals, the first switch unit turns off and the second switch unit turns on, and the source driver provides even-numbered rows of TFT pixel units with data signal through n source driving chips and second data lines of every column.

The driving circuit of liquid crystal panels described above reduces signal charging frequency of data lines, cuts down power consumption of liquid crystal panels, brings down number of driving chips applied, lessens difficulty for designing and manufacturing driving circuits, and saves production cost.

Below is detailed description of the preferred embodiment of the present invention with reference to figures.

Figure 1:
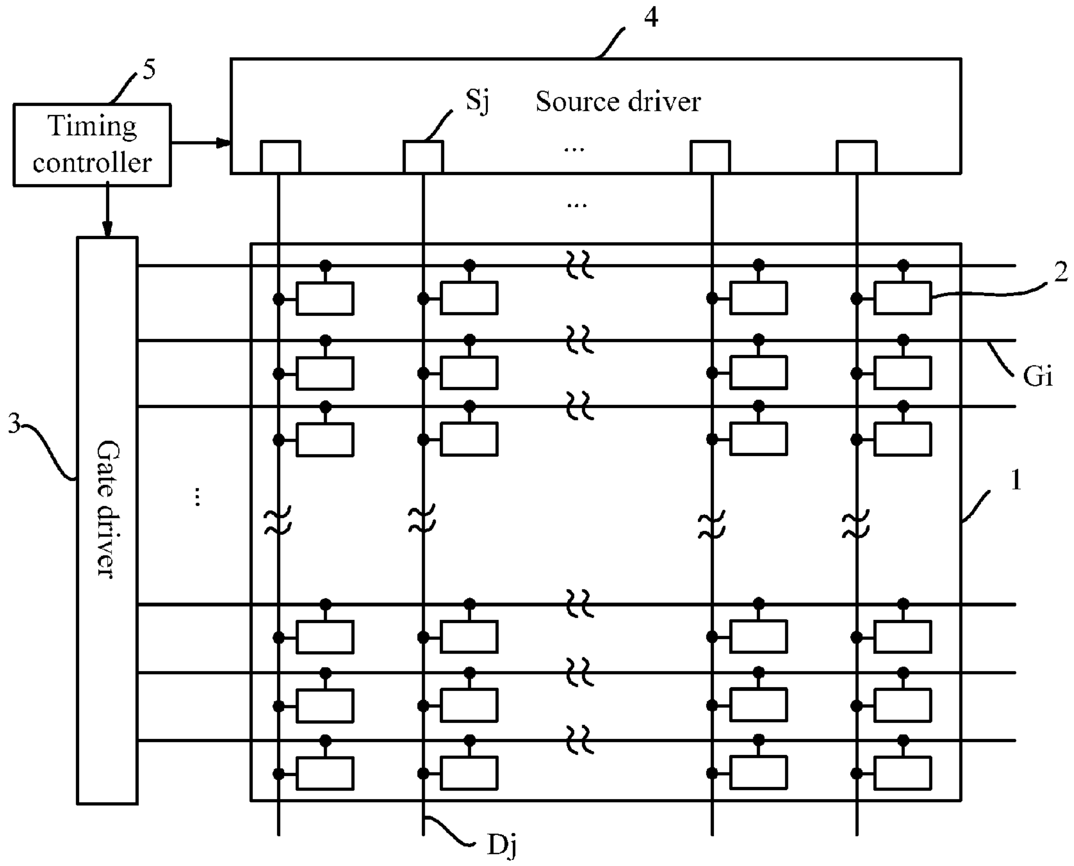
FIG. 1 shows a schematic diagram of a conventional driving circuit for driving a liquid crystal panel.
Figure 2:
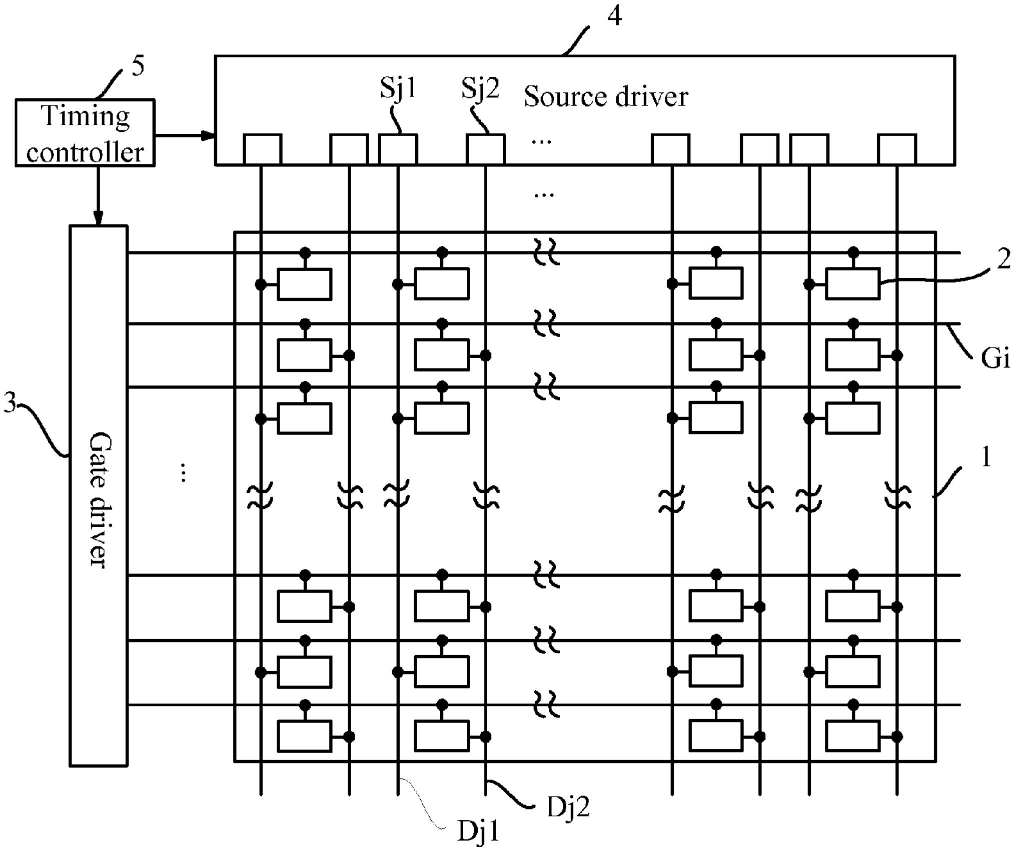
FIG. 2 shows a schematic diagram of a driving circuit for driving a liquid crystal panel according to a preferred embodiment of the present invention.
Figure 3:
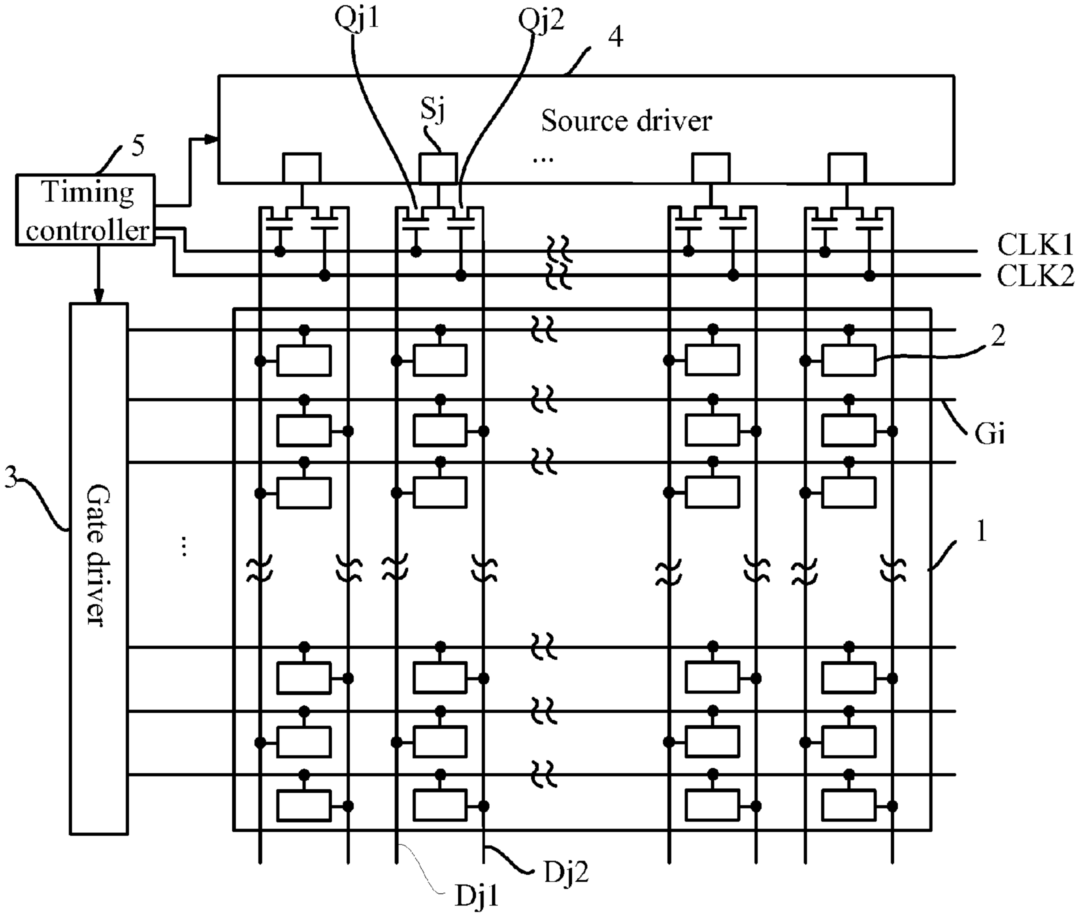
FIG. 3 shows a schematic diagram of a driving circuit for driving a liquid crystal panel according to another preferred embodiment of the present invention.

As FIG. 3 indicates, the driving circuit of the liquid crystal panel provided in the embodiment comprises:

m rows×n columns of TFT pixel units 2 dispersed on a glass substrate 1, a gate driver 3, a source driver 4, a timing controller 5,m scan lines Gi and 2n data lines Dj1 and Dj2 dispersed between arrays of the TFT pixel units 2. The timing controller 5 provides the gate driver 3 and the source driver 4 with timing signal. A $i^{th}$ row of TFT pixel units 2 is connected to a $i^{th}$ scan line Gi. M scan lines are connected to the gate driver 3 which provide m rows of TFT pixel units 2 with scan signal with m scan lines. A first data line Dj1 and a second data line Dj2 are set up correspondingly to a $j^{th}$ column of TFT pixel units 2. Odd-numbered rows of TFT pixel units 2 of the $j^{th}$ column are connected to the first data line Dj1, and even-numbered rows of TFT pixel units 2 of the $j^{th}$ column are connected to the second data line Dj2. The first data line Dj1 and the second data line Dj2 are connected to one source driving chip Sj1 set up in the source driver 3 through a first switch unit Qi1 and a second switch unit Qj2 respectively. The source driver 3 provides n columns of TFT pixel units 2 with data signal through n source driving chip Sj and 2n data lines Dj1 and Dj2. M and n are both integer above zero; i=1,2,3, . . . ,m; j=1,2,3, . . . ,n.

Figure 4:
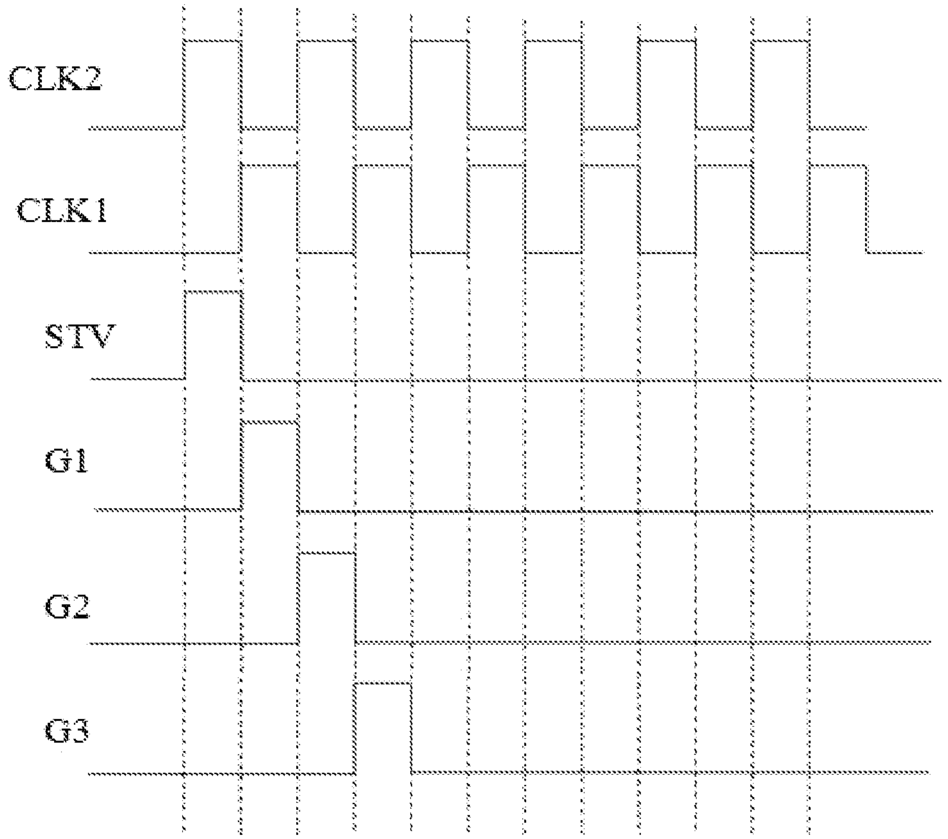
FIG. 4 shows timing diagram of the driving circuit as shown in FIG. 3.

In the embodiment, a first switch unit Qj1 and a second switch unit Qj2 are connected to the timing controller 5 respectively, and the timing controller 5 controls turning on and off of the first switch unit Qj1 and the second switch unit Qj2. More particularly, the first switch unit Qj1 is a first MOS transistor, the second switch unit Qj2 is a second MOS transistor; the gate of the first MOS transistor is connected to the timing controller 5 through a first clock line CLK1, the source of the first MOS transistor is connected to the source driving chip Sj, the drain of the first MOS transistor is connected to the first data line Dj1; the gate of the second MOS transistor is connected to the timing controller 5 through a second clock line CLK2, the source of the second MOS transistor is connected to the source driving chip Sj, the drain of the second MOS transistor is connected to the second data line Dj2;

The method of driving the driving circuit of liquid crystal panels as mentioned above comprises:

providing timing signal to the gate driver 3 and the source driver 4 through the timing controller 5;

providing scan signal to every row of m rows of the TFT pixel units 2 through the gate driver 3;

providing data signal to n columns of the TFT pixel units 2 through the source driver 4; wherein when the gate driver 3 provides odd-numbered rows of the TFT pixel units 2 with scan signals, the timing controller 5 controls turning on of the first switch unit Qj1 and turning off of the second switch unit Qj2 through the first clock line CLK1 and the second clock line CLK2, and the source driver 4 provides odd-numbered rows of the TFT pixel units 2 with data signal by being connected to the first data line Dj1 through the source driving chip Sj; when the gate driver 3 provides even-numbered rows of the TFT pixel units 2 with scan signals, the timing controller 5 controls turning off of the first switch unit Qj1 and turning on of the second switch unit Qj2 through the first clock line CLK1 and the second clock line CLK2, and the source driver 4 provides even-numbered rows of the TFT pixel units 2 with data signal by being connected to the second data line Dj2 through the source driving chip Sj. The driving timing chart of the driving circuit is illustrated as FIG. 4, where CLK1 and CLK2 represent the first clock line and a first clock line signal waveform, STV represents trigger signal waveform, and G1-G3 represent the waveform of the first to the third scan lines. It is necessary to mention that in FIG. 4 only waveforms of the first to the third scan line are illustrated and the gate driver 3 successively turns on m scan lines Gi. In FIG. 4, when the first clock line is at high level, odd-numbered scan lines are turned on; when the second clock line is at high level, even-numbered scan lines are turned on.

Another embodiment also proposes a liquid crystal display (LCD) comprising a liquid crystal panel which comprises a color filter substrate and a TFT array substrate set up in opposite to the color film substrate and a liquid crystal layer therebetween. M rows×N columns of TFT pixel units disperse on the TFT array substrate, and every pixel unit corresponds to one of a first, a second and a third color (red, green, blue), wherein the driving circuit of the liquid crystal panel applies the driving circuit and the driving method whereof as described above.

In sum, the present invention provides a driving circuit of a liquid crystal panel that connects two data lines in one column of the TFT pixel units to one source driving chip through two switch units, and switch units decide whether to provide odd-numbered rows of the TFT pixel units with data signals of the source driving chip through a first data line, or to provide even-numbered rows of the TFT pixel units with data signals of the source driving chip through a second data line, resulting in decrease of signal charging frequency of data lines, reduction of power consumption of the liquid crystal panel, decline of number of source driving chips applied, less difficulty for designing and manufacturing driving circuits, and finally, drop of production cost.

The terms "a" or "an", as used herein, are defined as one or more than one. The term "another", as used herein, is defined as at least a second or more. The terms "including" and/or "having" as used herein, are defined as comprising. It should be noted that if it is described in the specification that one component is "connected," "coupled" or "joined" to another component, a third component may be "connected," "coupled," and "joined" between the first and second components, although the first component may be directly connected, coupled or joined to the second component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit of a liquid crystal panel, comprising: a glass substrate with m rows×n columns of TFT pixel units, a gate driver, a source driver, a timing controller, m scan lines and 2n data lines dispersed between arrays of the TFT pixel units; wherein the timing controller provides the gate driver and the source driver with timing signals;

every row of TFT pixel units is connected to a scan line, and the m scan lines are connected to the gate driver which provides m rows of the TFT pixel units with scan signals through the m scan lines;

a first data line and a second data line are set up correspondingly to every column of the TFT pixel units; odd-numbered rows in every column of the TFT pixel units are connected to the first data line, and even-numbered rows in every column of the TFT pixel units are connected to the second data line; the first data line and the second data line are connected to one source driving chip set up in the source driver through a first switch unit and a second switch unit respectively; the source driver provides n columns of the TFT pixel units with data signals through n source driving chip and 2n data lines; m and n are both integers greater than zero.

2. The driving circuit of the liquid crystal panel of claim 1, wherein when the gate driver provides odd-numbered rows of the TFT pixel units with scan signals, the first switch unit turns on and the second switch unit turns off, and the source driver provides odd-numbered rows of the TFT pixel units with data signals through n source driving chips and first data lines in every column; when the gate driver provides even-numbered rows of the TFT pixel units with scan signals, the first switch unit turns off and the second switch unit turns on, and the source driver provides even-numbered rows of the TFT pixel units with data signals through n source driving chips and second data lines in every column.

3. The driving circuit of the liquid crystal panel of claim 1, wherein the first switch unit and the second switch unit are connected to the timing controller respectively, and the timing controller controls turning on or off the first switch unit and the second switch unit.

4. The driving circuit of the liquid crystal panel of claim 2, wherein the first switch unit and the second switch unit are connected to the timing controller respectively, and the timing controller controls turning on or off the first switch unit and the second switch unit.

5. The driving circuit of the liquid crystal panel of claim 4, wherein the first switch unit is a first MOS transistor, the second switch unit is a second MOS transistor; a gate of the first MOS transistor is connected to the timing controller through a first clock line, a source of the first MOS transistor is connected to the source driving chip, a drain of the first MOS transistor is connected to the first data line; a gate of the second MOS transistor is connected to the timing controller through a second clock line, a source of the second MOS transistor is connected to the source driving chip, a drain of the second MOS transistor is connected to the second data line.

6. A method of driving a liquid crystal panel, comprising:

providing a gate driver and a source driver with timing signals through a timing controller;

successively providing m rows of TFT pixel units with scan signals through the gate driver;

providing data signals to n columns of the TFT pixel units through the source driver; wherein a first data line and a second data line are set up correspondingly to every column of the TFT pixel units, odd-numbered rows of every column of the TFT pixel units are connected to the first data line, even-numbered rows of every column of the TFT pixel units are connected to the second data line, and the first data line and the second data line are connected to one source driving chip set up in the source driver through a first switch unit and a second switch unit respectively; the source driver provides n columns of the TFT pixel units with data signals through n source driving chips and 2n data lines; m and n are both integers greater than zero.

7. The method of claim 6, wherein when the gate driver provides odd-numbered rows of the TFT pixel units with scan signals, the first switch unit turns on and the second switch unit turns off, and the source driver provides odd-numbered rows of the TFT pixel units with data signals through n source driving chips and first data lines in every column; when the gate driver provides even-numbered rows of the TFT pixel units with scan signals, the first switch unit turns off and the second switch unit turns on, and the source driver provides even-numbered rows of the TFT pixel units with data signals through n source driving chips and second data lines in every column.

8. The method of claim 6, wherein the first switch unit and the second switch unit are connected to the timing controller respectively, and the timing controller controls turning on or off the first switch unit and the second switch unit.

9. The method of claim 7, wherein the first switch unit and the second switch unit are connected to the timing controller respectively, and the timing controller controls turning on or off the first switch unit and the second switch unit.

10. The method of claim 9, wherein the first switch unit is a first MOS transistor, the second switch unit is a second MOS transistor; a gate of the first MOS transistor is connected to the timing controller through a first clock line, a source of the first MOS transistor is connected to the source driving chip, a drain of the first MOS transistor is connected to the first data line; a gate of the second MOS transistor is connected to the timing controller through a second clock line, a source of the second MOS transistor is connected to the source driving chip, a drain of the second MOS transistor is connected to the second data line.

11. A liquid crystal display comprising a liquid crystal panel and a driving circuit for driving the liquid crystal panel, the liquid crystal panel comprising a color filter substrate, a TFT array substrate set up in opposite to the color film substrate and a liquid crystal layer therebetween, wherein the driving circuit comprises a glass substrate with m rows x n columns of TFT pixel units, a gate driver, a source driver, a timing controller, m scan lines and 2n data lines dispersed between arrays of the TFT pixel units; wherein the timing controller provides the gate driver and the source driver with timing signals;

every row of TFT pixel units is connected to a scan line, and the m scan lines are connected to the gate driver which provides m rows of the TFT pixel units with scan signals through the m scan lines;

a first data line and a second data line are set up correspondingly to every column of the TFT pixel units; odd-numbered rows in every column of the TFT pixel units are connected to the first data line, and even-numbered rows in every column of the TFT pixel units are connected to the second data line; the first data line and the second data line are connected to one source driving chip set up in the source driver through a first switch unit and a second switch unit respectively; the source driver provides n columns of the TFT pixel units with data signals through n source driving chip and 2n data lines; m and n are both integers greater than zero.

12. The liquid crystal display of claim 11, wherein when the gate driver provides odd-numbered rows of the TFT pixel units with scan signals, the first switch unit turns on and the second switch unit turns off, and the source driver provides odd-numbered rows of the TFT pixel units with data signals through n source driving chips and first data lines in every column; when the gate driver provides even-numbered rows of the TFT pixel units with scan signals, the first switch unit turns off and the second switch unit turns on, and the source driver provides even-numbered rows of the TFT pixel units with data signals through n source driving chips and second data lines in every column.

13. The liquid crystal display of claim 11, wherein the first switch unit and the second switch unit are connected to the timing controller respectively, and the timing controller controls turning on or off the first switch unit and the second switch unit.

14. The liquid crystal display of claim 12, wherein the first switch unit and the second switch unit are connected to the timing controller respectively, and the timing controller controls turning on or off the first switch unit and the second switch unit.

15. The liquid crystal display of claim 14, wherein the first switch unit is a first MOS transistor, the second switch unit is a second MOS transistor; a gate of the first MOS transistor is connected to the timing controller through a first clock line, a source of the first MOS transistor is connected to the source driving chip, a drain of the first MOS transistor is connected to the first data line; a gate of the second MOS transistor is connected to the timing controller through a second clock line, a source of the second MOS transistor is connected to the source driving chip, a drain of the second MOS transistor is connected to the second data line.

* * * * *